(12) United States Patent
Venkataraman et al.

(10) Patent No.: US 12,430,375 B2
(45) Date of Patent: *Sep. 30, 2025

(54) METHOD FOR ADAPTIVE CONVERSATION STATE MANAGEMENT WITH FILTERING OPERATORS APPLIED DYNAMICALLY AS PART OF A CONVERSATIONAL INTERFACE

(71) Applicant: Adeia Guides Inc., San Jose, CA (US)

(72) Inventors: Sashikumar Venkataraman, Andover, MA (US); Ahmed Nizam Mohaideen Pathurudeen, Kovilpatti (IN); K China Srinivasulu Reddy, Marathalli (IN); Mangesh Dattatray Pujari, Navi Mumbai (IN); Soumyadip Majumder, West Bengal (IN); Rakesh Barve, Bangalore (IN); Murali Aravamudan, Andover, MA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,033

(22) Filed: Jul. 21, 2023

(65) Prior Publication Data

US 2023/0359656 A1   Nov. 9, 2023

Related U.S. Application Data

(63) Continuation of application No. 18/074,138, filed on Dec. 2, 2022, which is a continuation of application
(Continued)

(51) Int. Cl.
*G06F 16/30*   (2019.01)
*G06F 16/2453*   (2019.01)
(Continued)

(52) U.S. Cl.
CPC .... *G06F 16/3349* (2019.01); *G06F 16/24535* (2019.01); *G06F 16/907* (2019.01); *G06F 16/9535* (2019.01)

(58) Field of Classification Search
CPC ............... G06F 16/3349; G06F 16/907; G06F 16/24535

See application file for complete search history.

(56) References Cited

U.S. PATENT DOCUMENTS

| 6,044,347 A | 3/2000 | Abella et al. |
| 6,125,345 A | 9/2000 | Modi et al. |

(Continued)

FOREIGN PATENT DOCUMENTS

| EP | 2907022 | * | 8/2015 |
| JP | 2011076364 A | | 4/2011 |

(Continued)

OTHER PUBLICATIONS

Japanese Patent Application No. 201884095, Office Action dated Aug. 31, 2021, with-Pending-Claims (15 pages).

(Continued)

*Primary Examiner* — Daniel A Kuddus
(74) *Attorney, Agent, or Firm* — HALEY GUILIANO LLP

(57) ABSTRACT

A system and method of processing a search request is provided. Identification of a desired content item is based on comparing a topic of the search request to previous user input. The method includes providing access to a set of content items with metadata that describes the corresponding content items and providing information about previous searches. The method further includes receiving a present input from the user and determining a relatedness measure between the information about the previous searches and an element of the present input. If the relatedness measure is (Continued)

high, the method also includes selecting a subset of content items based on comparing the present input and information about the previous searches with the metadata that describes the subset of content items. Otherwise, the method includes selecting a subset of content items based on comparing the present input with the metadata that describes the subset of content items.

20 Claims, 8 Drawing Sheets

Related U.S. Application Data

No. 17/172,970, filed on Feb. 10, 2021, now Pat. No. 11,544,310, which is a continuation of application No. 16/015,492, filed on Jun. 22, 2018, now Pat. No. 10,949,453, which is a continuation of application No. 13/801,958, filed on Mar. 13, 2013, now Pat. No. 10,031,968.

(60) Provisional application No. 61/712,720, filed on Oct. 11, 2012.

(51) Int. Cl.
G06F 16/3349 (2025.01)
G06F 16/907 (2019.01)
G06F 16/9535 (2019.01)

(56) References Cited

U.S. PATENT DOCUMENTS

| | | | |
|---|---|---|---|
| 6,236,968 B1 | 5/2001 | Kanevsky et al. | |
| 6,665,659 B1 | 12/2003 | Logan | |
| 6,731,307 B1 | 5/2004 | Strubbe et al. | |
| 6,885,990 B1 | 4/2005 | Ohmori et al. | |
| 7,356,772 B2 | 4/2008 | Brownholtz et al. | |
| 7,461,061 B2 | 12/2008 | Aravamudan et al. | |
| 7,593,932 B2 | 9/2009 | Lindh et al. | |
| 7,711,570 B2 | 5/2010 | Galanes et al. | |
| 7,739,280 B2* | 6/2010 | Aravamudan | G06F 16/284 707/765 |
| 7,774,294 B2 | 8/2010 | Aravamudan et al. | |
| 7,835,998 B2* | 11/2010 | Aravamudan | H04N 21/44222 706/45 |
| 7,895,218 B2 | 2/2011 | Venkataraman et al. | |
| 7,925,974 B1 | 4/2011 | McConnell et al. | |
| 7,930,168 B2 | 4/2011 | Weng et al. | |
| 8,073,848 B2* | 12/2011 | Aravamudan | G06F 16/2462 706/45 |
| 8,073,860 B2* | 12/2011 | Venkataraman | G06F 16/951 707/769 |
| 8,078,473 B1 | 12/2011 | Gazdzinski | |
| 8,078,884 B2* | 12/2011 | Ramakrishnan | G06F 21/32 726/16 |
| 8,112,454 B2 | 2/2012 | Aravamudan et al. | |
| 8,112,529 B2 | 2/2012 | Van et al. | |
| 8,140,327 B2 | 3/2012 | Kennewick et al. | |
| 8,145,636 B1 | 3/2012 | Jeh et al. | |
| 8,160,883 B2 | 4/2012 | Lecoeuche | |
| 8,171,087 B2 | 5/2012 | Carrer et al. | |
| 8,172,637 B2 | 5/2012 | Brown | |
| 8,204,751 B1 | 6/2012 | Di et al. | |
| 8,219,397 B2 | 7/2012 | Jaiswal et al. | |
| 8,229,753 B2 | 7/2012 | Galanes et al. | |
| 8,577,671 B1 | 11/2013 | Barve et al. | |
| 8,635,240 B2* | 1/2014 | Venkataraman | G06F 16/90324 707/765 |
| 8,886,645 B2 | 11/2014 | Jones et al. | |
| 8,943,154 B1 | 1/2015 | Bodell et al. | |
| 9,262,455 B2 | 2/2016 | Palay | |
| 10,284,506 B2 | 5/2019 | Buchheit et al. | |

| | | | |
|---|---|---|---|
| 2001/0021909 A1 | 9/2001 | Shimomura et al. | |
| 2002/0058490 A1 | 5/2002 | Sorrells et al. | |
| 2002/0152267 A1 | 10/2002 | Lennon | |
| 2003/0088397 A1 | 5/2003 | Karas et al. | |
| 2004/0015365 A1 | 1/2004 | Ohmori et al. | |
| 2004/0025180 A1 | 2/2004 | Begeja et al. | |
| 2005/0055210 A1 | 3/2005 | Venkataraman et al. | |
| 2005/0125224 A1 | 6/2005 | Myers et al. | |
| 2006/0075044 A1 | 4/2006 | Fox et al. | |
| 2006/0080107 A1* | 4/2006 | Hill | G10L 15/1822 704/275 |
| 2006/0259473 A1 | 11/2006 | Li et al. | |
| 2007/0174407 A1 | 7/2007 | Chen et al. | |
| 2007/0226295 A1 | 9/2007 | Haruna et al. | |
| 2007/0266026 A1* | 11/2007 | Aravamudan | G06F 16/337 |
| 2007/0276773 A1* | 11/2007 | Aravamudan | H04N 21/466 707/E17.06 |
| 2007/0276821 A1* | 11/2007 | Aravamudan | G06F 16/9535 707/999.005 |
| 2008/0046229 A1 | 2/2008 | Maskey et al. | |
| 2008/0071452 A1* | 3/2008 | Tan | B60T 8/172 701/70 |
| 2008/0071542 A1 | 3/2008 | Yu | |
| 2008/0104032 A1 | 5/2008 | Sarkar | |
| 2008/0109741 A1 | 5/2008 | Messing et al. | |
| 2008/0189269 A1* | 8/2008 | Olsen | G06F 16/951 707/999.005 |
| 2008/0240379 A1 | 10/2008 | Maislos et al. | |
| 2009/0106375 A1 | 4/2009 | Carmel et al. | |
| 2009/0210411 A1 | 8/2009 | Murata et al. | |
| 2009/0228439 A1 | 9/2009 | Manolescu et al. | |
| 2009/0234814 A1* | 9/2009 | Boerries | G06F 16/951 |
| 2009/0248672 A1 | 10/2009 | Mcintire et al. | |
| 2009/0306979 A1 | 12/2009 | Jaiswal et al. | |
| 2009/0319270 A1 | 12/2009 | Gross | |
| 2009/0319917 A1 | 12/2009 | Fuchs et al. | |
| 2010/0002685 A1 | 1/2010 | Shaham et al. | |
| 2010/0017205 A1 | 1/2010 | Visser et al. | |
| 2010/0017366 A1* | 1/2010 | Robertson | G06F 16/24575 |
| 2010/0049684 A1 | 2/2010 | Adriaansen et al. | |
| 2010/0131870 A1 | 5/2010 | Park | |
| 2010/0241625 A1* | 9/2010 | Aravamudan | G06F 16/437 707/E17.06 |
| 2011/0010316 A1 | 1/2011 | Hamilton et al. | |
| 2011/0040554 A1 | 2/2011 | Audhkhasi et al. | |
| 2011/0113039 A1 | 5/2011 | Venkataraman et al. | |
| 2011/0145847 A1 | 6/2011 | Barve et al. | |
| 2011/0195696 A1 | 8/2011 | Fogel et al. | |
| 2011/0212428 A1 | 9/2011 | Baker | |
| 2012/0016678 A1 | 1/2012 | Gruber et al. | |
| 2012/0022872 A1 | 1/2012 | Gruber et al. | |
| 2012/0023175 A1 | 1/2012 | Deluca | |
| 2012/0117516 A1 | 5/2012 | Guinness | |
| 2012/0159379 A1 | 6/2012 | Negrillo et al. | |
| 2013/0022275 A1 | 1/2013 | Inoue et al. | |
| 2013/0041755 A1 | 2/2013 | Ivanov et al. | |
| 2013/0282704 A1 | 10/2013 | Pantel et al. | |
| 2014/0025705 A1 | 1/2014 | Barve et al. | |
| 2014/0247268 A1 | 9/2014 | Drucker et al. | |
| 2017/0235848 A1 | 8/2017 | Van Dusen et al. | |
| 2021/0200798 A1 | 7/2021 | Venkataraman et al. | |
| 2023/0161799 A1 | 5/2023 | Venkataraman et al. | |

FOREIGN PATENT DOCUMENTS

| | | | |
|---|---|---|---|
| JP | 2011090546 A | | 5/2011 |
| JP | 2011210043 A | | 10/2011 |
| WO | 2006099105 A2 | | 9/2006 |
| WO | 2013155619 A1 | | 10/2013 |
| WO | WO2014059342 A2 * | | 4/2014 |
| WO | 2014183035 A1 | | 11/2014 |

OTHER PUBLICATIONS

Sakaki, et al., "Construction of related terms thesauri from the web," Journal of Natural Language Processing, 14 (2):3-31 (2007).

(56) References Cited

OTHER PUBLICATIONS

"City browser: developing a conversational automotive HMI", CHI 2009—Spotlight on Works in Progress—Session 2, Boston, MA, USA, Apr. 4-9, 2009. pp. 4291-4296 ISBN: 978-1-60558•247-4 10.1145/1520340.1520655 .<http://c11.acm.org/citation.cfm?id=1520655>.

"Dialogue Systems: Multi-Modal Conversational Interfaces for activity based dialogues", (4 pages, retrieved Apr. 4, 2013) http://godel.stanford.edu/old/witas/ <https://webmail.veveo.net/exchweb/bin/redirasp?URL=http://godel.stanford.edu/old/witas/>.

"International Search Report and Written Opinion", issued by the U.S. Patent and Trademark Office as International Searching Authority for corresponding International Application No. PCT/US13/053457 mailed Feb. 20, 2014 (18 pgs.).

"International Searching Authority and Written Opinion", issued by the U.S. Patent and Trademark Office as International Searching Authority for International Application No. PCT/US13/64644 mailed Apr. 22, 2014 (13 pgs.).

Acomb, K., et al., "Technical Support Dialog Systems: Issues, Problems and Solutions, Bridging the Gap", Academic and Industrial Research in Dialog Technologies Workshop Proceedings, pp. 25-31, NAACL-HLT, Rochester, NY, Apr. 2007. c 2007 Association for Computational Linguistics.

Balchandran, R., et al., "A Multi-modal Spoken Dialog System for Interactive TV", ICMI'08; pp. 191-192 (Oct. 20-22, 2008).

Baldwin, et al., "Autonomous Self-Assessment of Autocorrections: Exploring Text Message Dialogues", 2012 Conf. of the N. Amer. Chapter of Computational Linguistics: Human Language Technologies, pp. 710-719 (2012).

Bennacef, et al., "A Spoken Language System for Information Retrieval", Proc. ICSLP 1994, 4 pages (Sep. 1994).

Bimbot, et al., "Variable-length Sequence Modeling: Multigrams", IEEE Signal Proc. Letters, vol. 2, No. 6, Jun. 1995 (3 pgs.).

Bocchieri, et al., "Understanding Spontaneous Speech", http:/wwwthepieraccinis.com/publications/1995/AIIA 95. pdf, Journal of the Italian Assoc of Artificial Intelligence, Sep. 1995 (5 pgs.).

Bonneau-Maynard, et al., "Dialog Strategies in a tourist information spoken dialog system", SPECOM '98, Saint Petersburgh, pp. 115-118 (1998).

Carpenter, et al., "A Portable, Server-Side Dialog Framework for VoiceXML", Proc of ICSLP2002, Denver (CO), Sep. 16-20, 2002 (5 pgs.).

Caskey, et al., "Interactive Grammar Inference with Finite State Transducers", ASRU '03 Workshop on Automatic Speech Recognition and Understanding, St. Thomas, USVI, Nov. 30-Dec. 4, 2003 (IEEE) pp. 572-576.

Eckert, et al., "User Modeling for Spoken Dialogue System Evaluation", <http://www.thepieraccinis.com/publications/1997/ASRU.sub.--97.su.--u- ser.pdf> ASRU '97, 1997 (pp. 80-87).

Hakimov, et al., "Named entity recognition and disambiguation using linked data and graph-based centrality scoring", SWIM '12 Proceedings of the 4th International Workshop on Semantic Web Information Management Article No. 4 ACM New York, NY, USA. 7 pgs.

Ibrahim, A., et al., "Multimodal Dialogue Systems for Interactive TV Applications", (6 pages, date not available) http://www.google.co.in/search?sugexp=chrome,mod=11&sourceid=chrome&ie=UTF•8&q=Multimodal+Dialogue +Systems+for-.

Jack, et al., "Preferences and Whims: Personalised Information Retrieval on Structured Data and Knowledge Management", http://www.mendeley,com/profilestkris-jackipublications/Report>/, 2 pgs.

Jung, et al., "Using Utterance and Semantic Level Confidence for Interactive Spoken Dialog Clarification", J. Comp. Sci. Eng., vol. 2(1): 1-25 (Mar. 2008).

Karanastasi, et al., "A Natural Language Model and a System for Managing TV—Anytime Information from Mobile Devices", (12 pgs., date not available) http://pdfaminer.orq/000/518/459/a natural language model and a system for managing tv.pdf.

Lee, et al., "Combining Acoustic and Language Information for Emotion Recognition", Proc of ICSLP 2002, Denver (CO), Sep. 16-20, 2002. 5 pgs.

Lee, et al., "Subword-based large vocabulary speech recognition", AT&T Tech. Journal, vol. 72, No. 5, Sep./Oct. 1993, pp. 25-36, Total 14 pgs.

Levin, et al., "A stochastic model of computer-human interaction for learning dialogue, strategies", ESCA, Eurospeech 97, Rhodes, Greece, ISSN 1018-4074, Sep. 1997. 5 pgs.

Levin, et al., "CHRONUS, the next generation", Proc. 1995 ARPA Spoken Language Systems Tech. Workshop, Austin, Texas, Jan. 22-25, 1995 (4 pgs.).

Levin, et al., "Concept-based spontaneous speech understanding system", EUROSPEECH, 4th European Conference of Speech Communication and Technology.

Levin, et al., "Using Markov decision process for learning dialogue strategies", Proc. ICASSP 98, Seattle, WA, May 1998 (p. 201-204).

Meng, et al., "The Use of Belief Networks for Mixed-Initiative Dialog Modeling", IEEE Transactions on Speech and Audio Processing, vol. 11, No. 6, pp. 757-773, Nov. 2003.

Paek, T., et al., "Automating spoken dialogue management design using machine learning: An industry perspective", Speech Communication, vol. 50, 2008, pp. 716-729.

Pieraccini, et al., "A Learning Approach to Natural Language Understanding, Speech Recognition and Coding", Springer-Verlag, Bubion (Granada), Spain, 1993 (21 pgs.).

Pieraccini, et al., "A Multimodal Conversational Interface for a Concept Vehicle", <http://www.thepieraccinis.com/publications/2003/Eurospeech.sub.--03.pdf>, Eurospeech2003., Geneva (Switzerland), Sep. 2003 (4 pgs.).

Pieraccini, et al., "A spontaneous-speech understanding system for database query applications", ESCA Workshop on Spoken Dialogue Systems—Theories & Applications, Vigso, Denmark, Jun. 1995 (4 pgs.).

Pieraccini, et al., "Algorithms for speech data reduction & recognition", Esprit 85 Status Report of Continuing Work, Proc. of 2nd Esprit Technical Week, Brussels, Sep. 1985 (14 pages).

Pieraccini, et al., "AMICA: the AT&T Mixed Initiative Conversational Architecture", Proc. of EUROSPEECH 97, Rhodes, Greece, Sep., 1997 (5 pgs.).

Pieraccini, et al., "Are We There Yet? Research in Commercial Spoken Dialog Systems, in Text, Speech and Dialogue", 12th International Conference, TSD 2009, Pilsen, Czech Republic, Sep. 2009, Vaclav Matousek and Pavel Mautner (Eds): pp. 3:13.

Pieraccini, et al., "Automatic learning in spoken language understanding", <http://www.thepieraccinis.com/publications/1992/ICSLP.sub.--92.pdf>->, Proc. 1992 International Conference on Spoken Language Processing (ICSLP), Banff, Alberta, Canada, Oct. 1992, pp. 405-408.

Pieraccini, et al., "ETUDE, a Recursive Dialog Manager with Embedded User Interface Pattern", Proc. of ASRU01—IEEE Workshop, Madonna di Campiglio, Italy, Dec. 2001 as printed in IEEE, 2002, pp. 244-247.

Pieraccini, et al., "Learning how to understand language", <http://www.thepieraccinis.com/publications/1993/Eurospeech.s- ub.--93.sub.--Keynote.pdf>, Proc. EUROSPEECH '93, Berlin, Germany, Sep. 1993, pp. 1407-1412.

Pieraccini, et al., "Multimodal Conversational Systems for Automobiles", Communications of the ACM, Jan. 2004, vol. 47, No. 1, pp. 47-49.

Pieraccini, et al., "Multi-modal Spoken Dialog with Wireless Devices", Proc. of ISCA Tutorial and Research Workshop—Multimodal Dialog in Mobile Environments—Jun. 17-19, 2002—Kloster Irsee, Germany as printed in Text, Speech and Language Tech., vol. 28, 2005. pp. 169-184.

Pieraccini, et al., "Spoken Language Communication with Machines: the Long and Winding Road from Research to Business, in M. Ali and F. Esposito (Eds)", IEA/AIE 2005,LNAI 3533, pp. 6-15, 2005, Springer-Verlag.

Pieraccini, et al., "Spoken Language Dialog: Architectures and Algorithms", Proc. of XXIIemes Journees d'Etude sur la Parole, Martigny (Switzerland), Jun. 1998, 21 pgs.

(56) References Cited

OTHER PUBLICATIONS

Pieraccini, et al., "Stochastic representation of semantic structure for speech understanding", Speech Comm., vol. 11 (1992) pp. 283-288.

Pieraccini, R., "The Industry of Spoken-Dialog Systems and the Third Generation of Interactive Applications, in Speech Technology: Theory and Applications, F. Chen and K. Jokinen, editors,", Springer, 2010, pp. 61-77.

Pieraccini, et al., "Where do we go from here? Research and Commercial Spoken Dialog Systems, Recent Trends in Discourse and Dialog", Lisbon, Portugal, Sep. 2-3, 2005. pp. 1-10 as printed in Springer Sci. and Bus. Media, 2008. Total 26 pgs.

Riccardi, et al., "Non deterministic stochastic language models for speech recognition", ICASSP '95, Detroit, 1995, pp. 237-240.

Rooney, B., "AI System Automates Consumer Gripes, Jun. 20, 2012; (2 pgs.); <http://blogs.wsj.com/tech-europe/2012/06/20/ai-system-automates-consu- mer-complaints/>", Jun. 20, 2012; (2 pgs.); <http://blogs.wsj.com/tech-europe/2012/06/20/ai-system-automates-consu- mer-complaints/>.

Roush, W., "Meet Siri's Little Sister, Lola. She's Training for a Bank Job", (Jun. 27, 2012) (4 pages) http://www.xconomy.com/san-francisco/2012/06/27/meet-siris-little-sister-lola-shes.training-for-a-bank-job/?single_page=true.

Rudnicky, A., et al., "An Agenda-Based Dialog Management Architecture for Spoken Language Systems", School of Computer Science, Carnegie Mellon University, Pittsburgh, PA 15213 (4 pages, date not available).

Smart, J., "The Conversational Interface: Our Next Great Leap Forward (aka Conversational User Interface, Linguistic UI, Natural UI, Spoken Dialog System, etc.)", (18 pages, Retrieved Apr. 4, 2013) http://www.accelerationwatch.com/lui.html <https://webmail.veveo.net/exchweb/bin/redirasp?URL=http://www.accelerationwatch.com/lui. html>.

\* cited by examiner

400 ⟶

Name
[        ]
*e.g. Audrey Hepburn*

[Visit Now]
ad feedback

Birth Date [?]
[    ] to [    ]
*Format: YYYY-MM-DD, YYYY-MM, or YYYY*

Name Groups
☐ Best Actress-Nominated              ☐ Best Actor-Nominated
☐ Best Actress-Winning                ☐ Best Actor-Winning
☐ Best Supporting Actress-Nominated   ☐ Best Supporting Actor-Nominated
☐ Best Supporting Actress-Winning     ☐ Best Supporting Actor-Winning
☐ Best Director-Nominated             ☐ Best Director-Winning
☐ Oscar-Winning

Star Sign
☐ Aquarius    ☐ Pisces    ☐ Aries        ☐ Taurus
☐ Gemini      ☐ Cancer    ☐ Leo          ☐ Virgo
☐ Libra       ☐ Scorpio   ☐ Sagittarius  ☐ Capricorn 405 ⟶ Birth Place
[                    ]

405 ⟶ Death Date
[    ] to [    ]
*Format: YYYY-MM-DD, YYYY-MM, or YYYY*

Death Place
[                    ]

Gender
☐ Males    ☐ Females

Height
[  ▼] to [  ▼]

410 ⟶ Filmography [?]
[🔍                  ]

Biographies [?]
*Search for words that might appear in the Mini-Biography*
[                    ]

Lists
*You must login or register to use this feature.*

Name Data [?]
| Awards        |
| Biography     |
| Birth Date    |
| Date of Death |
| Height Info   |
| Quotes        |

Common Cast / Crew Between Two Titles

To find a list of people who worked together on two titles, start typing the first title and select it from the drop-down. Then, advance to the second box and follow the same steps. Once you have Your two titles selected, click the search button to continue

[ 🔍                                           ]
[ 🔍                                           ]

[ Search ]

Two People Working Together

To begin, start typing one person's name in the first box and select the name from the drop-down list of possible matches. Then, advance to the second box and follow the same steps. Once you have your two names selected, click the search button to continue

[ 🔍                                           ]
[ 🔍                                           ]

[ Search ]

FIG. 3

METHOD FOR ADAPTIVE CONVERSATION STATE MANAGEMENT WITH FILTERING OPERATORS APPLIED DYNAMICALLY AS PART OF A CONVERSATIONAL INTERFACE

CROSS-REFERENCE TO RELATED APPLICATIONS

This application is a continuation of U.S. patent application Ser. No. 18/074,138, filed Dec. 2, 2022, which is a continuation of U.S. patent application Ser. No. 17/172,970, filed Feb. 10, 2021, (now U.S. Pat. No. 11,544,310), which is a continuation of U.S. patent application Ser. No. 16/015,492, filed Jun. 22, 2018, (now U.S. Pat. No. 10,949,453), which is a continuation of U.S. patent application Ser. No. 13/801,958, filed Mar. 13, 2013, (now U.S. Pat. No. 10,031,968), which claims the benefit under 35 U.S.C. § 119 (e) to U.S. Provisional Patent Application No. 61/712,720 entitled Method for Adaptive Conversation State Management Filtering Operators Applied Dynamically as Part of a Conversation Interface, filed on Oct. 11, 2012, the contents of which are incorporated by reference in their entireties.

BACKGROUND OF THE INVENTION

Field of Invention

A method for adaptive conversation state management in a conversational interface for information retrieval where filtering operators can be dynamically applied to modify the conversation state is disclosed.

Description of Related Art and Context of the Invention

The filtering operators themselves are part of the conversation exchanges and are inferred from the exchanges. The conversation state space dynamically adapts to the filtering operators, expanding or pruning state, and adjusting weights of items in the conversation space, based on the operators. One method described in the present disclosure also implicitly flushes the state space annulling all applied filters, when it detects a conversation thread boundary. One method described in the present disclosure enables the conversation exchange to be closer in spirit to human interactions, where intent expression straddles across multiple exchanges and conversation threads are often seamlessly woven into a continuous flow. Furthermore, the embodiments of the present invention enable a natural correction method for user input errors, such as errors in speech recognition—these input errors can be corrected by users vocalizing filtering operations as part of the conversation exchanges with the information retrieval system.

Information retrieval process, in non-conversational interfaces, is often multistep, even when user intent is clear and unambiguous. This may be due to multiple factors, one of which is the potential set of matches to user intent may be large. In such cases, user typically culls the match space by specifying constraints or filters (e.g. adding more key words in Google search bar to an existing search query, turning on a filter to show only five-star rated products on a web site). At the other end of this spectrum of factors requiring multistep information retrieval, is the case where the matches are too few, from a choice perspective. In this case, user would broaden the intent by specifying broadening filters (e.g. turning on a filter that includes third party vendor products too in the search results on a commerce site).

Information retrieval in non-conversational interfaces is inherently multistep when user intent is not clear. The retrieval process is exploratory; where user not only applies culling, and expanding filters, but also traverses paths related to content that piques user's interest (e.g. traversing related items in a commerce site like amazon.com).

In all these non-conversational interfaces, user progressively applies filters in the content discovery process. User explicitly manages the filters to be applied for each step of the discovery process. Information retrieval systems that are session based, reset the filters on each session boundary, where a session could be defined, for example, as a new search input. In information retrieval systems that are not session based, users are burdened even more by having to selectively reset inapplicable filters across conversation threads.

People typically apply filters when they converse with each other, but the management of filters feels so much easier, than when interacting with non-conversation interfaces. This is perhaps because application of a filter is as simple as mentioning it as part of the conversation. Even more importantly, the state space of the topic being discussed smoothly adapts to the exchanges and evolves simultaneously in the minds of the participants engaged in the conversation, liberating them of the need to explicitly manage and synchronize the state space of conversation by reiterating or recalling. Additionally, when people converse, conversation thread boundaries do not require conscious resetting of filters; neither do people feel a tension that inapplicable filters are being transferred to a new thread. These are perhaps essential factors contributing to an engaging conversation and are often summed up in the words of a participant—"when X and I talk, we are in sync". Needless to say, in the case of humans, it is not just the liberation from synchronizing conversation state space among participants, but the fact that the participants can also simultaneously distill concepts from the state space in the backdrop of their personal experiences and knowledge, and express contextually relevant thoughts within the conversation as ideas, opinions, counter-arguments etc. The liberation from synchronization of state space is the edifice. The exchange of thoughts relies on and wraps around building on this edifice.

Conversational systems that strive for the modest goal of emulating the edifice of human conversations by adaptively maintaining state of the conversation as filters are dynamically applied by user within the conversation, and implicitly recognizing conversation thread boundaries, to reset these filters, would go a long way in improving the user experience.

Speech recognition has finally reached a threshold opening up the possibility of conversational systems to become main stream, at least in limited use case scenarios. However, speech recognition still falters on accent variations, and mobile environments. Filtering operations are essential, particularly in mobile environments, where speech recognition partially succeeds, so user can apply filters, without having to repeat the expressed intent all over again.

In summary, the present disclosure describes methods of managing the state of a conversation in information retrieval systems, allowing the application of filters, as part of the conversation. The method further recognizes conversation thread boundaries and annuls the filters automatically without explicit user intervention. Methods described in the present disclosure are also applicable when speech recognition errors result in a response that partially satisfy user intent-user can speak filtering operations without having to repeat the original intent all over again.

SUMMARY OF THE INVENTION

In an embodiment of the invention, a method of processing a search request received from a user, the search request directed at identifying a desired item from a set of items, in which the identification is based on comparing a topic of the search request to previous user input, is provided. The method includes providing access to a set of content items. Each of the content items is associated with metadata that describes the corresponding content items. The method also includes providing information about at least one search previously received from a user and receiving a present input from the user. The present input is intended by the user to identify a desired content item. The method further includes determining a measure of relatedness between the information about the at least one previous search and an element of the present input. The method includes, upon a condition in which the relatedness measure does not exceed a threshold value, selecting a subset of content items based on comparing the present input with the metadata that describes the subset of content item. The method further includes, upon a condition in which the relatedness measure exceeds the threshold value, selecting a subset of content items based on comparing the present input and information about the at least one previous search with the metadata that describes the subset of content items.

In another embodiment, the method includes, upon a condition in which the relatedness measure does not exceed the threshold value, resetting a conversation state space as the elements of the present input and, upon a condition in which the relatedness measure exceeds the threshold value, augmenting the conversation state space with the elements of the present input. The conversation state space can store the at least one of previous search inputs.

In yet another embodiment, augmenting the conversation state space is based on at least one of adding at least one of the elements of the present input to the conversation state space and removing at least one of the elements of the conversation state space.

In a further embodiment, the method also includes providing access to a relationship database containing relationship distances of content items. The relatedness measure can be based on one of the relationship distances.

In another embodiment, the relationship database presents a relationship graph with nodes and edges. Each node can represent a content item and each edge can represent a direct relationship between any two content items.

In yet another embodiment, a relationship distance of two content items is measured in a number of hops between two nodes corresponding to the two content items.

In another embodiment, a relationship distance of two content items is measured in a smallest number of hops between two nodes corresponding to the two content items.

In a different embodiment, each edge has a weight, and a relationship distance of two content items is a sum of weights of edges connecting two nodes corresponding to the two content items.

In yet another embodiment, the relationship distances are modified by user preferences acquired over time.

In a further embodiment, the method includes providing access to a database containing historical inputs. The relationship distances of content items can be determined based on how often the content items were used together.

In another embodiment, the method includes providing access to a database containing user preferences acquired over time and modifying the determined relatedness measure based on the user preferences.

In yet another embodiment, determining the elements of the present input is based on applying a predefined rule. The predefined rule can use a Bayes classifier.

In another embodiment, the threshold value is adjusted based on feedback from the user.

A system for processing a search request received from a user, the search request directed at identifying a desired item from a set of items, in which the identification is based on comparing a topic of the search request to previous user input is provided. The system includes computer readable instructions encoded on a non-transitory computer readable medium. The computer readable instructions causes a computer system to provide access to a set of content items. Each of the content items is associated with metadata that describes the corresponding content items. The computer readable instructions also cause the computer system to provide information about at least one search previously received from a user, receive a present input from the user intended to identify a desired content item, and determine a measure of relatedness between the information about the at least one previous search and an element of the present input. The computer readable instructions cause the computer system to, upon a condition in which the relatedness measure does not exceed a threshold value, select a subset of content items based on comparing the present input with the metadata that describes the subset of content items. The computer readable instructions also cause the computer system to, upon a condition in which the relatedness measure exceeds the threshold value, select a subset of content items based on comparing the present input and information about the at least one previous search with the metadata that describes the subset of content items.

BRIEF DESCRIPTION OF THE DRAWINGS

For a more complete understanding of various embodiments of the present invention, reference is now made to the following descriptions taken in connection with the accompanying drawings in which:

FIG. 2 illustrates a user interface approach incorporated here for elucidative purposes.

FIG. 3 illustrates a user interface approach incorporated here for elucidative purposes.

DETAILED DESCRIPTION OF THE PREFERRED EMBODIMENTS

Figure 1:
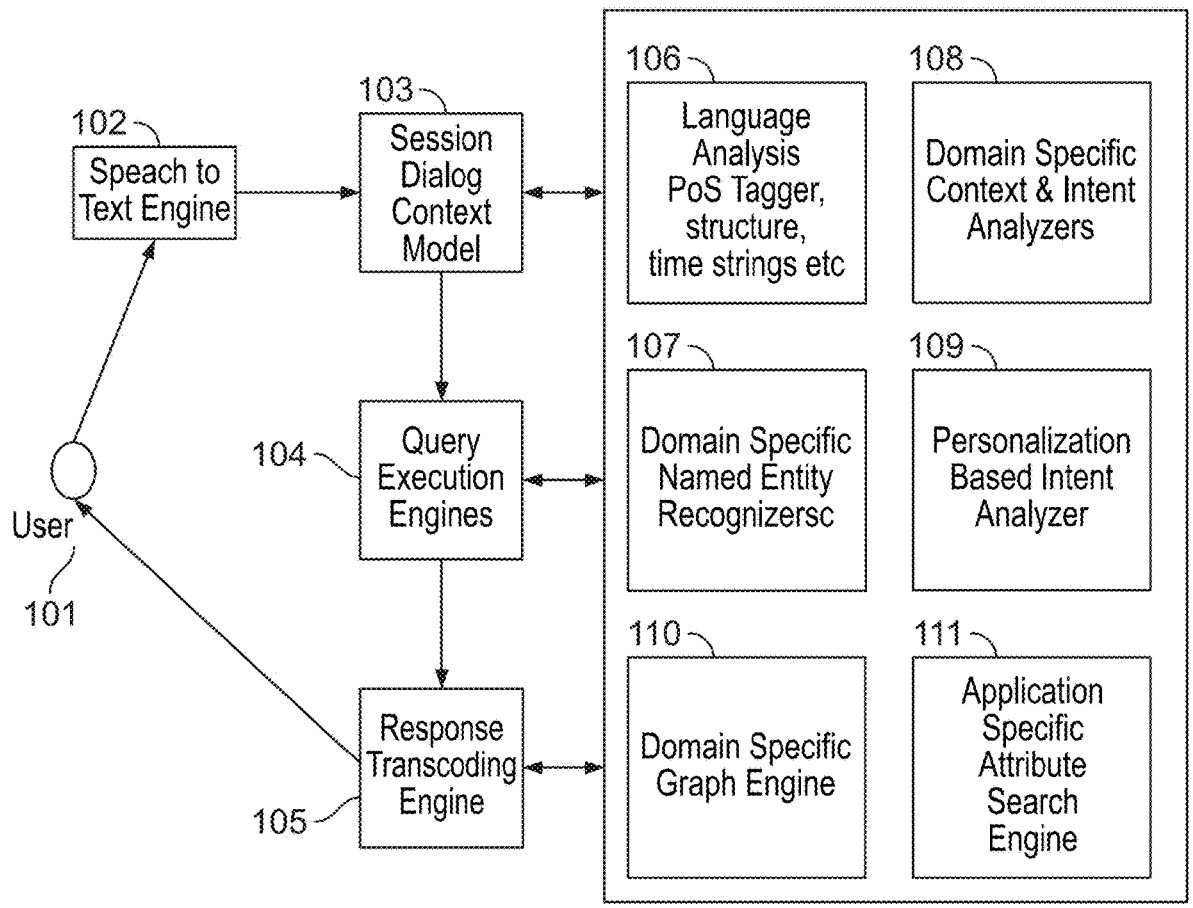
FIG. 1 illustrates an architecture that is an embodiment of the present invention.

Preferred embodiments of the present invention and their advantages may be understood by referring to FIG. 1-8, wherein like reference numerals refer to like elements.

Conversational System Architecture

FIG. 1 represents the overall system architecture of an embodiment of the present invention for information retrieval using speech input. Embodiments of the invention described herein can, optionally, work in conjunction with the techniques and systems set forth in U.S. patent application Ser. No. 13/667,388, entitled Method of and Systems for Using Conversation State Information in a Conversational Interaction System, filed on Nov. 2, 2012 and U.S. patent application Ser. No. 13/667,400, entitled Method of and Systems for Inferring User Intent in Search Input in a Conversational Interaction System, filed on Nov. 2, 2012, each of which is incorporated by reference herein. User 101 speaks his/her question that is fed to a speech to text engine 102. The speech to text engine outputs recognized words and pauses in a canonical format (e.g., in the form of a parse tree, using techniques known in the art). The text form of the user input is fed to session dialog content module 103. This module plays the role of maintaining state across conversation, a key use of which is to help in understanding user intent during a conversation, as described below.

The session dialog, in conjunction with a language analyzer (or part of speech tagger) 106, and the other entity recognizer modules described below, break down the sentence into its constituent parts that can be broadly categorized as (1) intents—the actual intent of the user, such as, find a movie, play a song, tune to a channel, respond to an email, etc. (2) entities—noun or pronoun phrases describing the intent and (3) filters—qualifiers to entities such the "latest" movie, "less" violence etc. Filters can operate on both intents and entities. The conversation state is composed of entities and intents with the application of filters on them.

In the context of the goal of providing an intelligent and meaningful conversation, the intent is perhaps the key among all three categories. Any good search engine can perform an information retrieval task fairly well just by extracting the entities from a sentence—without understanding the grammar or the intent. Consider the user question, "Can my daughter watch pulp fiction with me"—most search engines would show a link for pulp fiction, which may suffice to find the rating that may or may not be available from traversing that link. But in a conversational interface, the expectation is clearly higher—the system must ideally understand the (movie, rating) intent corresponding to the expected response of the rating of the movie and the age group it is appropriate for. A conversational interface response degenerating to that of a search engine is tantamount to a failure of the system from a user perspective. Intent determination, and even more importantly, responding to user's question that appears closer to a human's response when the intent is not known or clearly discernible, is key for a conversational interface that strives to be closer to human interaction than to a search engine. Intent analyzer 108 is a domain specific module that analyzes and classifies intent for a domain and works in conjunction with other modules—domain specific entity recognizer 107, personalization based intent analyzer 109 that classifies intent based on user's personal preferences, and the domain specific graph engine 110.

An entity recognizer 107 recognizes entities in user input. Entity recognition may optionally involves error correction or compensation for errors in user input, described in more detail below. In some embodiments, the classifying of a subset of user input as an entity is a weighting. There could be scenarios in which an input could be scored as both an entity and as an attribute during the analysis and resolution of the input into component parts. These ambiguities are resolved in many cases as the sentence semantics become clearer with subsequent processing of the user input. In some embodiments, one key component used for resolution is the entity relationship graph, described in more detail below. Output of the entity recognizer is a probability score for subsets of input to be entities.

The intent analyzer, in an embodiment of the invention, is a rules driven intent recognizer and/or a naïve Bayes classifier with supervised training. It takes as input a parse tree, entity recognizer output, and attribute specific search engine output (discussed below). In some implementations, user input may go through multiple entity recognition, the attribute recognition, and intent recognition steps, until the input is fully resolved. The intent recognizer deciphers the intent of a sentence, and also deciphers the differences in nuances of intent. For instance, given "I would like to see the movie Top gun" versus "I would like to see a movie like Top gun", the parse trees would be different. This difference assists the intent recognizer to differentiate the meaning of "like". The rules based recognition, as the very name implies, recognizes sentences based on predefined rules. Predefined rules are specific to a domain space, for example, entertainment. The naïve Bayes classifier component, however, just requires a training data set to recognize intent.

In embodiments that use entity relationship graphs (or equivalent data structures), the result information is incorporated into the graph along with the information that the techniques use to find the desired results. Thus, the output from the iterations of the intent analyzer 108, entity recognizer 107, and attribute specific search engine 111 can be the results the user is seeking. In cases where the results are not found or the discovered results lack sufficient confidence, the intermediate nodes/entities can be used to form clarifying questions to be passed to the user.

The attribute specific search engine 111 assists in recognizing filters and they influence the weights and properties of the entities and intents they qualify. While FIG. 1 is a conversation architecture showing the modules for a specific domain, embodiments of the present invention include a conversational interface that can take user input and engage in a dialog where user's intent can span domains. In an embodiment of the invention, this is accomplished by having multiple instances of the domain specific architecture shown in FIG. 1, and scoring the intent weights across domains to determine user intent based on how well a user input matches to a particular domain. Upon arriving at the results, certain embodiments of the invention can use portions of the results, in addition to the user entered information, to create and preserve the conversation state space.

Information Repositories Applicable to Embodiments of the Present Invention

In some embodiments, the present invention may use information repositories during information retrieval. Information repositories are associated with domains, which are groupings of similar types of information and/or certain types of content items. Certain types of information repositories include entities and relationships between the entities. Each entity/relationship has a type, respectively, from a set of types. Furthermore, associated with each entity/relationship are a set of attributes, which can be captured, in some embodiments, as a defined finite set of name-value fields. The entity/relationship mapping also serves as a set of metadata associated with the content items because the entity/relationship mapping provides information that describes the various content items. In other words, a particular entity will have relationships with other entities, and these "other entities" serve as metadata to the "particular entity". In addition, each entity in the mapping can have attributes assigned to it or to the relationships that connect the entity to other entities in the mapping. Collectively, this makes up the metadata associated with the entities/content items. In general, such information repositories are called structured information repositories. Examples of information repositories associated with domains follow below.

A media entertainment domain includes entities, such as, movies, TV-shows, episodes, crew, roles/characters, actors/personalities, athletes, games, teams, leagues and tournaments, sports people, music artists and performers, composers, albums, songs, news personalities, and/or content distributors. These entities have relationships that are captured in the information repository. For example, a movie entity is related via an "acted in" relationship to one or more actor/personality entities. Similarly, a movie entity may be related to an music album entity via an "original sound track" relationship, which in turn may be related to a song entity via a "track in album" relationship. Meanwhile, names, descriptions, schedule information, reviews, ratings, costs, URLs to videos or audios, application or content store handles, scores, etc. may be deemed attribute fields.

A personal electronic mail (email) domain includes entities, such as, emails, email-threads, contacts, senders, recipients, company names, departments/business units in the enterprise, email folders, office locations, and/or cities and countries corresponding to office locations. Illustrative examples of relationships include an email entity related to its sender entity (as well as the to, cc, bcc, receivers, and email thread entities.) Meanwhile, relationships between a contact and his or her company, department, office location can exist. In this repository, instances of attribute fields associated with entities include contacts' names, designations, email handles, other contact information, email sent/received timestamp, subject, body, attachments, priority levels, an office's location information, and/or a department's name and description.

A travel-related/hotels and sightseeing domain includes entities, such as, cities, hotels, hotel brands, individual points of interest, categories of points of interest, consumer facing retail chains, car rental sites, and/or car rental companies. Relationships between such entities include location, membership in chains, and/or categories. Furthermore, names, descriptions, keywords, costs, types of service, ratings, reviews, etc. all amount of attribute fields.

An electronic commerce domain includes entities, such as, product items, product categories and subcategories, brands, stores, etc. Relationships between such entities can include compatibility information between product items, a product "sold by" a store, etc. Attribute fields in include descriptions, keywords, reviews, ratings, costs, and/or availability information.

An address book domain includes entities and information such as contact names, electronic mail addresses, telephone numbers, physical addresses, and employer.

The entities, relationships, and attributes listed herein are illustrative only, and are not intended to be an exhaustive list.

Embodiments of the present invention may also use repositories that are not structured information repositories as described above. For example, the information repository corresponding to network-based documents (e.g., the Internet/World Wide Web) can be considered a relationship web of linked documents (entities). However, in general, no directly applicable type structure can meaningfully describe, in a nontrivial way, all the kinds of entities and relationships and attributes associated with elements of the Internet in the sense of the structured information repositories described above. However, elements such as domain names, internet media types, filenames, filename extension, etc. can be used as entities or attributes with such information.

For example, consider a corpus consisting of a set of unstructured text documents. In this case, no directly applicable type structure can enumerate a set of entities and relationships that meaningfully describe the document contents. However, application of semantic information extraction processing techniques as a pre-processing step may yield entities and relationships that can partially uncover structure from such a corpus.

Illustrative Examples of Accessing Information Repositories Under Certain Embodiments of the Present Invention The following description illustrates examples of information retrieval tasks in the context of structured and unstructured information repositories as described above.

In some cases, a user is interested in one or more entities of some type-generally called intent type herein-which the user wishes to uncover by specifying only attribute field constraints that the entities must satisfy. Note that sometimes intent may be a (type, attribute) pair when the user wants some attribute of an entity of a certain type. For example, if the user wants the rating of a movie, the intent could be viewed as (type, attribute)=(movie, rating). Such query-constraints are generally called attribute-only constraints herein.

Whenever the user names the entity or specifies enough information to directly match attributes of the desired intent type entity, it is an attribute-only constraint. For example, when the user identifies a movie by name and some additional attribute (e.g., 'Cape Fear' made in the 60s), or when he specifies a subject match for the email he wants to uncover, or when he asks for hotels based on a price range, or when he specifies that he wants a 32 GB, black colored iPod touch.

However, in some cases, a user is interested in one or more entities of the intent type by specifying not only attribute field constraints on the intent type entities but also by specifying attribute field constraints on or naming other entities to which the intent type entities are connected via relationships in some well-defined way. Such query-constraints are generally called connection oriented constraints herein.

An example of a connection oriented constraint is when the user wants a movie (an intent type) based on specifying two or more actors of the movie or a movie based on an actor and an award the movie won. Another example, in the context of email, is if the user wants emails (intent type) received from certain senders from a particular company in the last seven days. Similarly, a further example is if the user wants to book a hotel room (intent type) to a train station as well as a Starbucks outlet. Yet another example is if the user wants a television set (intent type) made by Samsung that is also compatible with a Nintendo Wii. All of these are instances of connection oriented constraints queries.

In the above connection-oriented constraint examples, the user explicitly describes or specifies the other entities connected to the intent entities. Such constraints are generally called explicit connection oriented constraints and such entities as explicit entities herein.

Meanwhile, other queries contain connection oriented constraints that include unspecified or implicit entities as part of the constraint specification. In such a situation, the user is attempting to identify a piece of information, entity, attribute, etc. that is not know through relationships between the unknown item and items the user does now. Such constraints are generally called implicit connection oriented constraints herein and the unspecified entities are generally called implicit entities of the constraint herein.

For example, the user may wish to identify a movie she is seeking via naming two characters in the movie. However, the user does not recall the name of one of the characters, but she does recall that a particular actor played the character. Thus, in her query, she states one character by name and identifies the unknown character by stating that the character was played by the particular actor.

However consider the following user constraints for specific information retrieval goals: The user wants the role (intent) played by a specified actor (e.g., 'Michelle Pfeiffer') in an unspecified movie that is about a specified role (e.g., the character 'Tony Montana'.) In this case the user's constraint includes an unspecified or implicit entity which corresponds to the movie 'Scarface.' Similarly, suppose that the user wants the movie (intent) starring the specified actor 'Scarlett Johannsen' and the unspecified actor who played the specified role of 'Obe Wan Kanobi' in a specified film 'Star Wars.' In this case the implicit entity is the actor 'Ewan McGregor' and the intent entity is the movie 'The Island' starring 'Scarlett Johannsen' and 'Ewan McGregor'.

In the context of email repository, an example includes a user wanting to get the last email (intent) from an unspecified gentleman from a specified company 'Intel' to whom he was introduced via email (an attribute specifier) last week. In this case, the implicit entity is a contact who can be discovered by examining contacts from 'Intel', via an employee/company relationship, who was a first time common-email-recipient with the user last week.

The above three examples are connection oriented constraints but they include unspecified or implicit entities as part of the constraint specification-We call such constraints implicit connection oriented constraints and call the unspecified entities as implicit entities of the constraint.

Relationship and Entity Relationship Graph

The relationship or connection engine 110 is one of the modules that plays a role in comprehending user input to offer a directed response. The relationship engine could be implemented in many ways, a graph data structure being one instance so that we may call the relationship engine by the name graph engine. The graph engine evaluates the user input in the backdrop of known weighted connections between entities.

In a graph data structure, entities are represented in nodes and relationships are represented in edges in the entity relationship graph. Each edge connects two nodes that are directly related (i.e., that are frequently associated with each other). For example, Boston and Red Sox may be directly related by a relationship called sports team. Also, New York and financial district may be directly related by a neighborhood relationship. The motivation for specifically employing the graph model is the observation that relevance, proximity, and relatedness in natural language conversation can be modeled simply by notions such as link-distance and, in some cases, shortest paths and smallest weight trees.

During conversation when a user dialog involves other entities related to the actually sought entities, a subroutine addressing information retrieval as a simple graph search problem effectively helps reduce dependence on deep unambiguous comprehension of sentence structure. Such an approach offers system implementation benefits. Even if the user intent calculation is ambiguous or inconclusive, so long as entities have been recognized in the user utterance, a graph-interpretation based treatment of the problem enables a system to respond in a much more intelligible manner than otherwise possible.

Implicit and explicit semantic relationships and links are created among members of the information repository itself, by performing statistical text processing, link analysis and analyses of other signals (for e.g. location information etc) on the metacontent available for the named entities. These relationships are always evolving, and over time are enhanced by aggregate usage analytics, collaborative filtering and other techniques.

Each named entity in an information repository is represented as a vector of weighted text-phrases (terms), in a manner similar to the way textual information retrieval work represents documents as a vector of weighted text-phrases. Since simple "tf-idf" (term frequency/inverse document frequency) based approaches alone are not adequate for the purposes of implementations of the invention in many important cases. The weight computation in the vector representation of named entities is designed to take advantage of many more information signals present in the way the text phrases are displayed, the positions of the text phrases within text descriptions of various kinds, and also the structural and positional properties of hyperlinks associated with text phrases. The weight computation is therefore based on a richer statistical and structural analysis of the textual, hyperlinking and other properties and relationships mined from metacontent in the information repository.

For example, two entities that are more frequently associated with each other might have a stronger relationship than two other entities. Boston and Red Sox may have a stronger relationship than Boston and the Common because people use, in their speech, the entities Boston and Red Sox together more often than Boston and the Common. The weighted relationships can be represented in the entity relationship graph. In some embodiments, edges have longer or shorter lengths to represent the weights. Alternatively, edges may have different width corresponding to the weights. In other embodiments, relationship values can be assigned to the edges. A stronger relationship may be represented with a smaller relationship value.

Explicit Connection Oriented Constraints

What follows are examples of explicit connection oriented constraints employed in information retrieval systems. Graph model terminology of nodes and edges can also be used to describe connection oriented constraints as can the terminology of entities and relationships.

When using an attribute-only constraints interface, the user only specifies the type and attribute constraints on intent entities. Meanwhile, when using an explicit connected node constraints interface, the user can additionally specify the type and attribute constraints on other nodes connected to the intent nodes via specified kinds of edge connections. One example of an interface known in the art that employs explicit connected node constraints during information retrieval is a Movie/TV information search engine 400 shown in FIG. 2.

Considering that the number of possible death and birth places 405 across all movie and TV personalities is a huge number, birth and death places are treated as nodes rather than attributes in the movie information repository graph. Thus, birth and death place specifications in the graphical user interface 400 are specifications for nodes connected to the intended personality node. The filmography filter 410 in the graphical user interface 400 allows a user to specify the name of a movie or TV show node, etc., which is again another node connected to the intended personality node. The other filters 500, shown in FIG. 3, of the graphical user interface are specifiers of the attributes of the intended node.

In the first part of the graphical user interface 400, a user may specify two movie or TV show nodes when his intent is to get the personalities who collaborated on both these nodes. In the second part of the graphical UI above, a user may specify two personality nodes when his intent is to get movie or TV show nodes corresponding to their collaborations. In both case, the user is specifying connected nodes other than his intended nodes, thereby making this an explicit connected node constraint. However, the interfaces known in the art do not support certain types of explicit connected node constraints (explicit connection oriented constraints), as described below.

Figure 4:
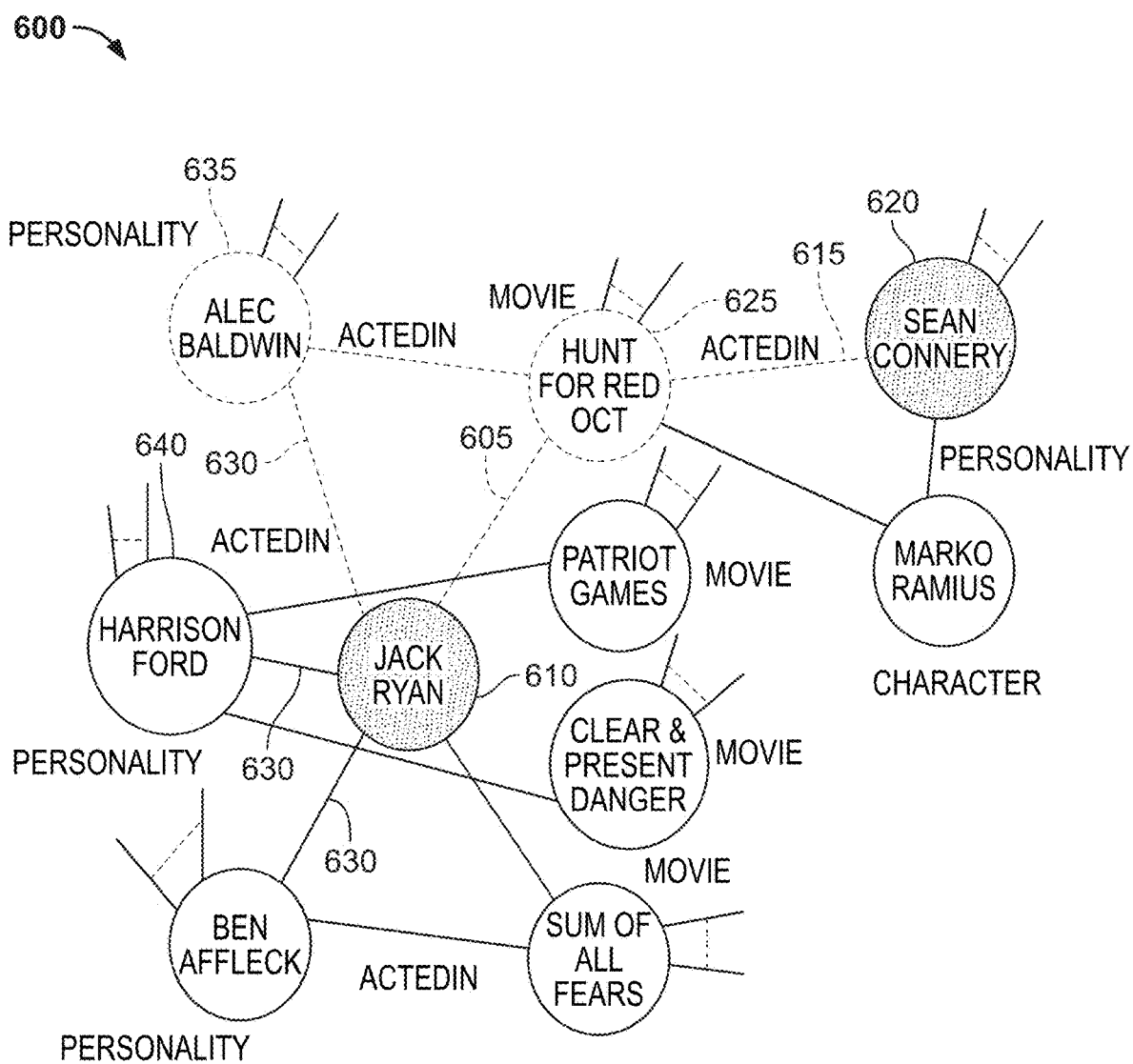
FIG. 4 illustrates an example of a graph that represents entities and relationships between entities.

FIG. 4 illustrates a graph 600 of the nodes (entities) and edges (relationships) analyzed by the inventive techniques disclosed herein to arrive at the desired result when the user seeks a movie based on the fictional character Jack Ryan that stars Sean Connery. The user may provide the query, "What movie has Jack Ryan and stars Sean Connery?" The techniques herein interpret the query, in view of the structured information repositories as: Get the node of type Movie (intent) that is connected by an edge 605 to the explicit node of type Role named 'Jack Ryan' 610 and also connected via an 'Acted In' edge 615 to the explicit node of type Personality named 'Sean Connery' 620. The techniques described herein return the movie 'The Hunt for the Red October' 625 as a result.

Referring again to FIG. 4, assume the user asks, "Who are all of the actors that played the character of Jack Ryan?" The disclosed techniques would interpret the query as:

Get nodes of type Personality (intent) connected by means of an 'Acted-as' edge 630 to the explicit node of type Role named 'Jack Ryan' 610. Embodiments of the inventive systems disclosed herein would return the actors 'Alec Baldwin' 635, 'Harrison Ford' 640, and 'Ben Affleck' 645.

A further example is a user asking for the name of the movie starring Tom Cruise based on a John Grisham book. Thus, the query becomes: Get the node of type Movie (intent) connected by an 'Acted In' edge to the explicit node of type Personality named Tom Cruise and connected by a 'Writer' edge to the explicit node of type Personality named 'John Grisham'. Embodiments of the inventive systems disclosed herein would return the movie 'The Firm'.

Implicit Connection Oriented Constraints

The following examples illustrate the implicit connection oriented constraints and implicit entities used for specific information retrieval goals. The first two examples used the terminology of entities and relationships.

Figure 5:
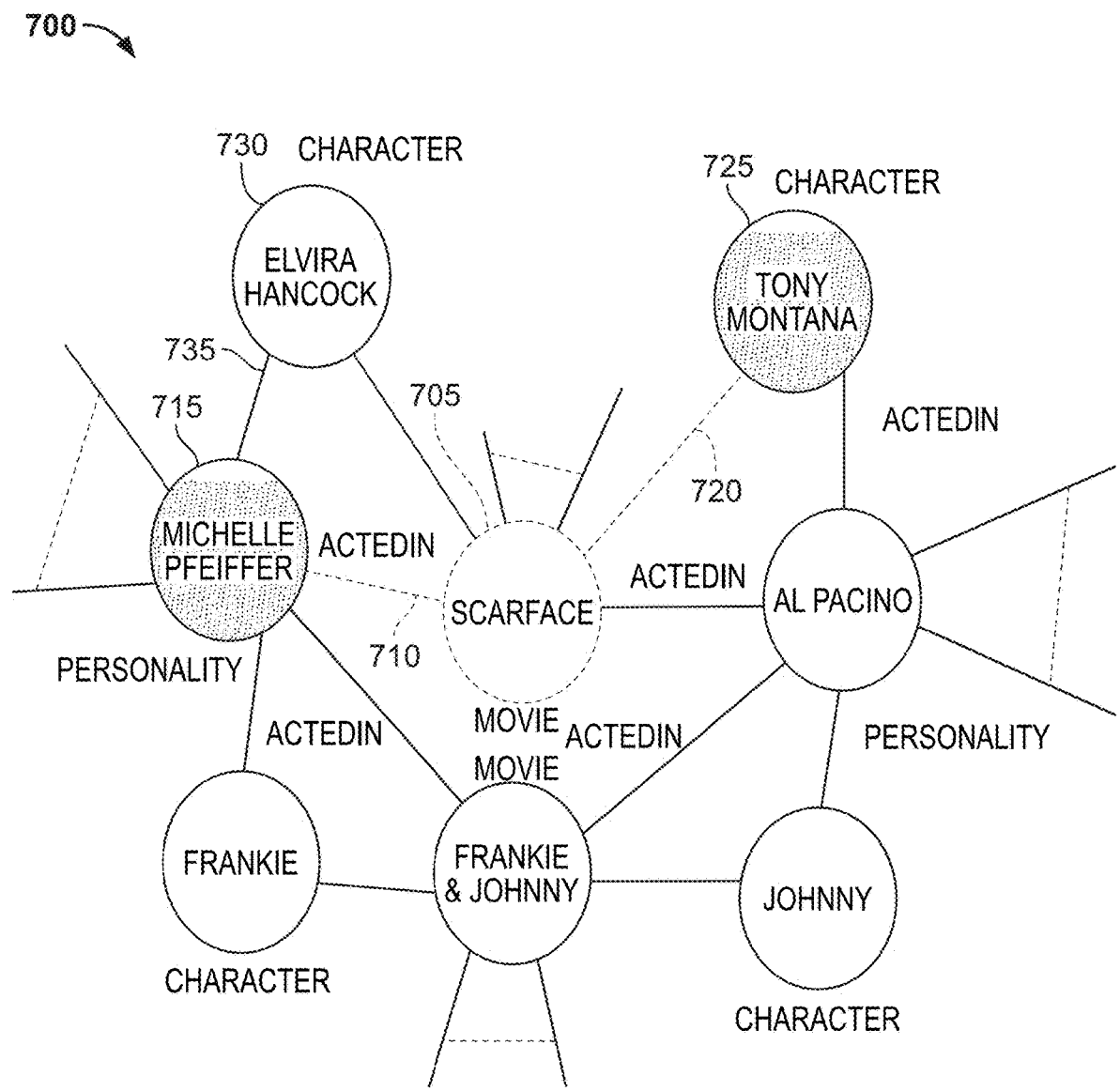
FIG. 5 illustrates an example of a graph that represents entities and relationships between entities.

In one example, the user wants the role (intent) played by a specified actor/personality (e.g., Michelle Pfeiffer) in an unspecified movie that is about a specified role (e.g., the character Tony Montana.) In this case, the user's constraint includes an unspecified or implicit entity. The implicit entity is the movie 'Scarface'. FIG. 5 illustrates a graph 700 of the entities and relationships analyzed by the techniques disclosed herein to arrive at the desired result. The graph 700 is an illustrative visual representation of a structured information repository. Specifically, the implicit movie entity 'Scarface' 705 is arrived at via a 'Acted In' relationship 710 between the movie entity 'Scarface' 705 and the actor entity 'Michelle Pfeiffer' 715 and a 'Character In' relationship 720 between the character entity 'Tony Montana' 725 and the movie entity 'Scarface' 705. The role entity 'Elvira Hancock' 730 played by 'Michelle Pfeiffer' is then discovered by the 'Acted by' relationship 735 to 'Michelle Pfeiffer' and the 'Character In' relationship 740 to the movie entity 'Scarface' 705.

In a further example, suppose that the user wants the movie (intent) starring the specified actor entity Scarlett Johansson and the unspecified actor entity who played the specified role of Obi-Wan Kenobi in a specified movie entity Star Wars. In this case, the implicit entity is the actor entity 'Ewan McGregor' and the resulting entity is the movie 'The Island' starring 'Scarlett Johansson' and 'Ewan McGregor'.

Figure 6:
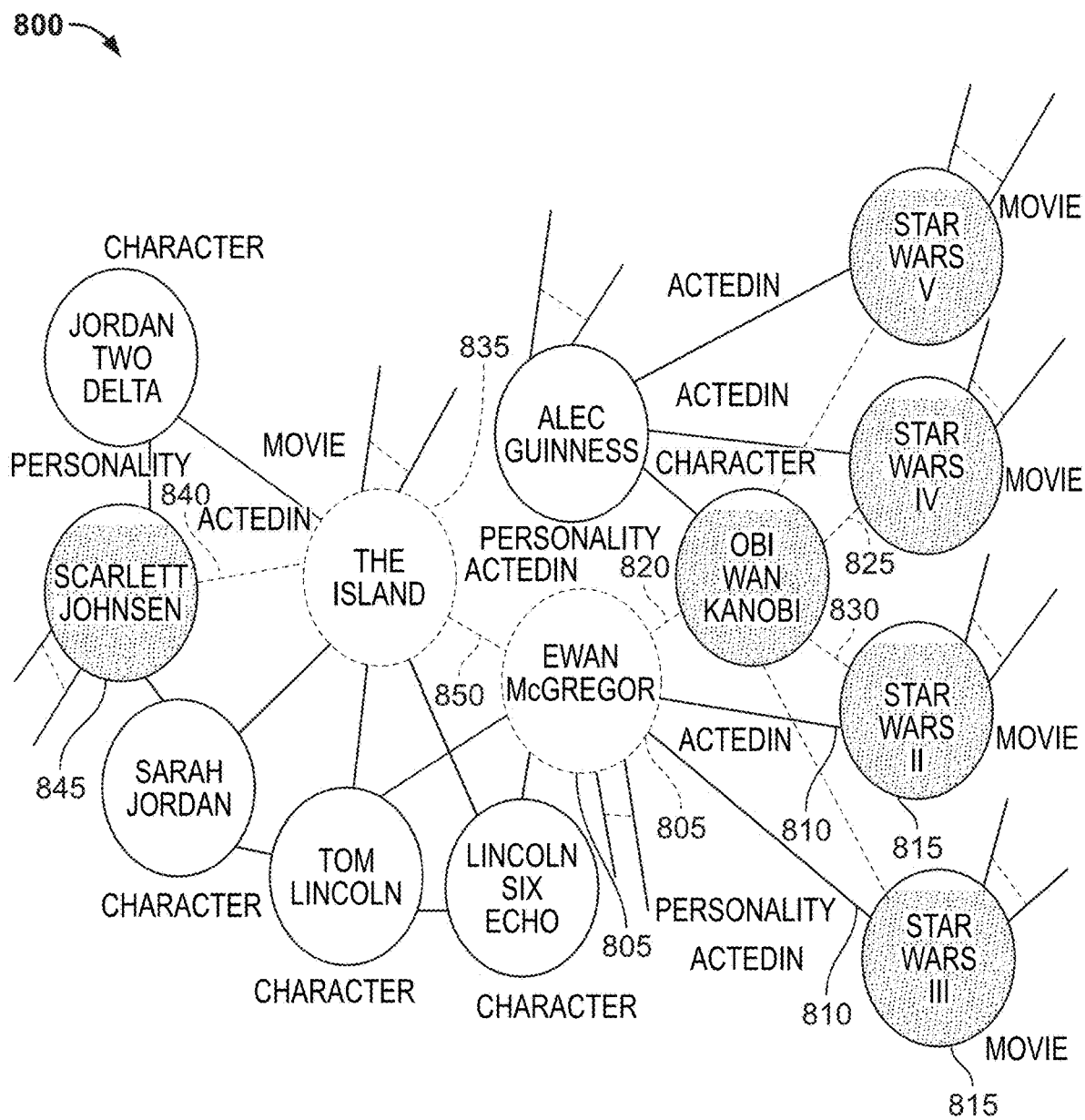
FIG. 6 illustrates an example of a graph that represents entities and relationships between entities.

FIG. 6 illustrates a graph 800 of the entities and relationships analyzed by the techniques disclosed herein to arrive at the desired result. Specifically, the implicit actor entity Ewan McGregor 805 is arrived at via an Acted In relationship 810 with at least one movie entity Star Wars 815 and via a Character relationship 820 to a character entity Obi-Wan Kenobi 825, which in turn is related via a Character relationship 830 to the movie entity Star Wars 815. Meanwhile, the result entity The Island 835 is arrived at via an Acted In relationship 840 between the actor/personality entity Scarlett Johansson 845 and the movie entity The Island 835 and an Acted In relationship 850 between the implicit actor entity Ewan McGregor 805 and the movie entity The Island.

Figure 7:
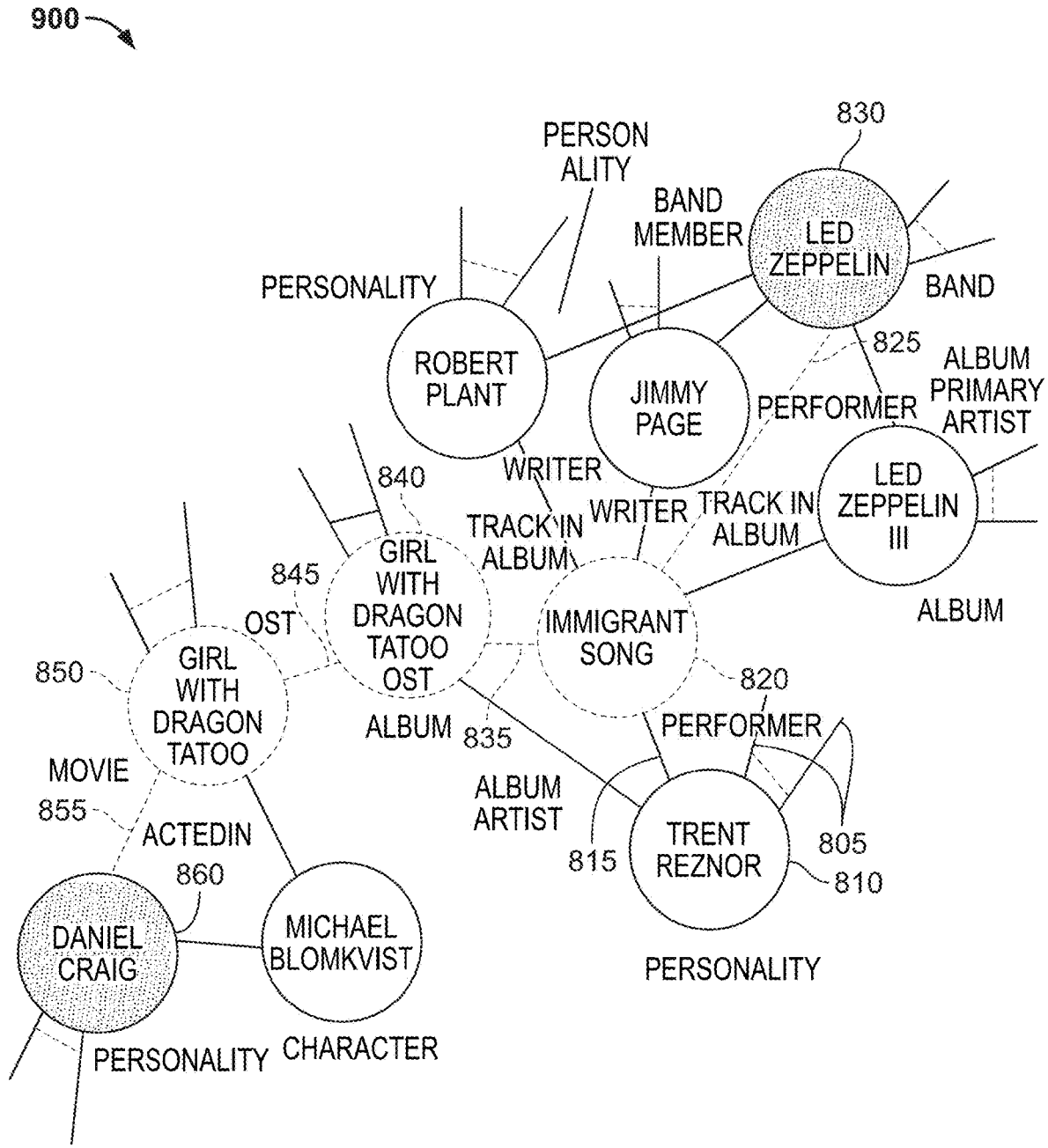
FIG. 7 illustrates an example of a graph that represents entities and relationships between entities.

FIG. 7 illustrates a graph 900 of the entities and relationships analyzed by the techniques disclosed herein to arrive at a desired result. This example uses the terminology of nodes and edges. The user knows that there is a band that covered a Led Zeppelin song for a new movie starring Daniel Craig. The user recalls neither the name of the covered song nor the name of the movie, but he wants to explore the other music (i.e., songs) of the band that did that Led Zeppelin cover. Thus, by specifying the known entities of Led Zeppelin (as the song composer) and Daniel Craig (as an actor in the movie), the interposing implied nodes are discovered to find the user's desired result. Thus, embodiments of the inventive techniques herein compose the query constraint as follows: Return the nodes of type Song (intent) connected by a 'Composer' edge 905 to an implicit node of type Band 910 (Trent Reznor) such that this Band node has a 'Cover Performer' edge 915 with an implicit node of type Song 920 (Immigrant Song) which in turn has a 'Composer' edge 925 with an explicit node of type Band named 'Led Zeppelin' 930 and also a 'Track in Album' edge 935 with an implicit node of type Album 940 (Girl with the Dragon Tattoo Original Sound Track) which has an 'Original Sound Track (OST)' edge 945 with an implicit node of type Movie 950 (Girl with the Dragon Tattoo Original Sound Track) that has an 'Acted In' edge 955 with the explicit node of type Personality named 'Daniel Craig'. 960.

As mentioned above, known techniques and systems for information retrieval suffer from a variety of problems. Described herein are embodiments of an inventive conversational interaction interface. These embodiments enable a user to interact with an information retrieval system by posing a query and/or instruction by speaking to it and, optionally, selecting options by physical interaction (e.g., touching interface, keypad, keyboard, and/or mouse). Response to a user query may be performed by machine generated spoken text to speech and may be supplemented by information displayed on a user screen. Embodiments of the conversation interaction interface, in general, allow a user to pose his next information retrieval query or instruction in reaction to the information retrieval system's response to a previous query, so that an information retrieval session is a sequence of operations, each of which has the user first posing a query or instruction and the system the presenting a response to the user.

Embodiments of the present invention are a more powerful and expressive paradigm than graphical user interfaces for the query-constraints discussed herein. In many situations, especially when it comes to flexibly selecting from among a large number of possible attributes or the presence of explicit and implicit connected nodes, the graphical user interface approach does not work well or does not work at all. In such cases, embodiments of the conversational interaction interface of the present invention are a much more natural fit. Further, embodiments of the present invention are more scalable in terms of the number of distinct attributes a user may specify as well as the number of explicit connected node constraints and the number of implicit node constraints relative to graphical user interfaces.

Conversation State Space

Figure 8:
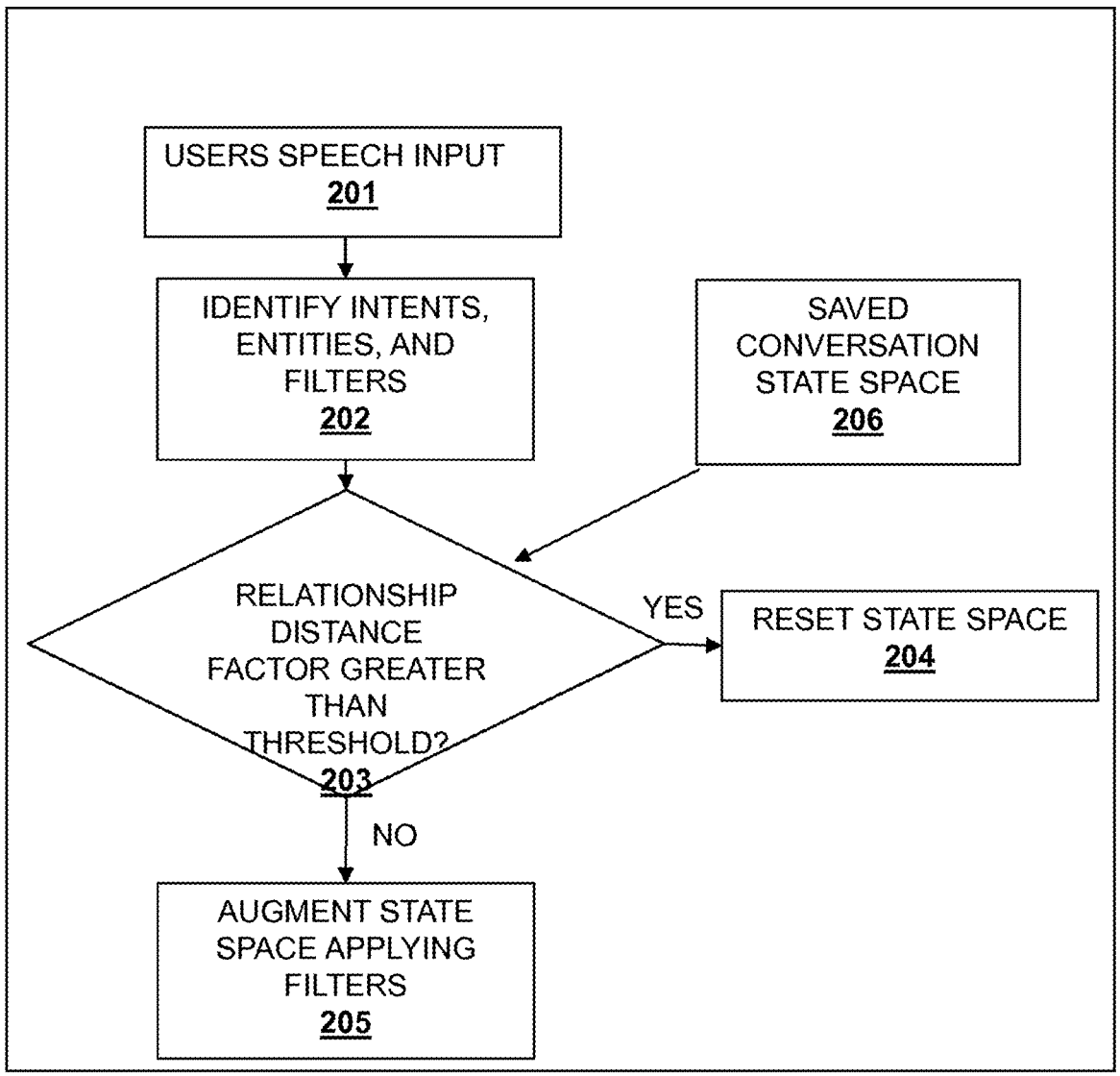
FIG. 8 illustrates the process of modification of the conversation state space each time user interacts with the system.

FIG. 8 represents the process of modification of the conversation state space each time user interacts with the system. The conversation state space is composed of entities and intents on which filters have been applied. The output of speech to text engine 201 is broken into entities, intents and filters 202 as described above. A relationship distance threshold of the currently spoken set of entities from the entities in the saved conversation state space 206 is evaluated 203 making use of graph engine 110. For embodiments using an entity relationship graph, the relationship distance can be measured in terms of "hops" between connected nodes. If edges of the entity relationship graph have weights associated with the relationship, the relationship distance can take the weight into consideration. For example, there may be two hops between Red Sox and San Francisco, having an intermediate node of Boston. The relationship value between Red Sox and Boston may be 0.8 and the relationship value between Boston and San Francisco may be 0.5. Then, the relationship distance between Red Sox and San Francisco may be 1.3.

When the entities in the current speech input are removed from the entities in the conversation state space beyond a certain relationship distance, all or a part of the conversation state space is reset 204. The domain of match of the currently input entities determines the active domain specific engine for the subsequent conversation thread. All or part of the state space is reset even if the domain specific engine for the subsequent conversation thread remains the same (the user still desires a movie, but the subsequent request is not related to the prior request). If the entities in the current speech input are within the threshold relationship distance from the entities in the conversation state space, the conversation state space is augmented 205 with the current entities and the filters in the current input are also applied to the entities and/or intents they operate on.

Whether one or more new entities is too far removed from those in the saved state can be a static number determined based on the nature of the domain. For example, for domains having relatively little branching between nodes, a lower number of hops between nodes would be used as a threshold. Meanwhile, for a domain space with extensive branching, a higher number of hops would be required before reaching a reset threshold. The threshold number can be a static value, or can be adjusted based on monitoring feedback from the user. For example, the threshold may be set at a relatively high value, and can be decreased as the system detects feedback from the user that the system is improperly combining new and old input information.

Furthermore, personalization can be taken into account when determining the relationship distance between saved conversation state. Thus, two nodes (i.e., entities) that are relatively far removed in the entity relationship graph may have a closer connection given a personalization overlay. For example, whenever a user searches for Chicago, he may always search for an airfare to Chicago. In this case, personalization may reduce the relationship distance between the two entities: Chicago and airfare. Thus, personalization introduces "shortcuts" in the graph space given what the system has learned of the user's preferences over time. Conversely, values in the conversation state can be reset by monitoring the "age" of the item-items farther back in time can be automatically reset after a defined period has passed since their use.

A personalization is based on a user preference signature that can be provided by the system using known techniques for discovering and storing such user preference information. For example, the methods and systems set forth in U.S. Pat. No. 7,774,294, entitled Methods and Systems for Selecting and Presenting Content Based on Learned Periodicity of User Content Selections, issued Aug. 10, 2010, U.S. Pat. No. 7,835,998, entitled Methods and Systems for Selecting and Presenting Content on a First System Based on User Preferences Learned on a Second System, issued Nov. 16, 2010, U.S. Pat. No. 7,461,061, entitled User Interface Methods and Systems for Selecting and Presenting Content Based on User Navigation and Selection Actions Associated with the Content, issued Dec. 2, 2008, and U.S. Pat. No. 8,112,454, entitled Methods and Systems for Ordering Content Items According to Learned User Preferences, issued Feb. 7, 2012, each of which is incorporated by reference herein, can be used with the techniques disclosed herein. However, the personalization, the use of user's preference signatures, and/or information is not limited to the techniques set forth in the incorporated applications.

During a conversation, there may be a need to resolve ambiguities in entities. When there are multiple results, user may desire to specify which result is of interest. In both these cases, user may specify filters or keywords to help resolve the ambiguity in entities or to specify a particular result of interest. The ability to specify these filters and keywords as part of the very conversation in stark contrast to systems where user has to select from menu choices in a graphical interface, make the conversation flow very natural and closer to human interactions. Furthermore, as mentioned earlier, the application of filters could dynamically expand and shrink the conversation state space in addition to modifying the weights of entities, to track the progression of user intent through the course of the conversation exchanges.

Examples

The following examples illustrate various embodiments:
1) The example below illustrates an addition of and a replacement of entities in the conversation state space.
User: "90s Baldwin movie with insurance fraud".
Response: System gives some result, which may not be the right answer.
User (implicitly adds a filter): "murder related".
Response: System still does not get desired result.
User (implicitly adds a filter): "possibly Kevin Kline".
Response: System replaces Baldwin with Kelvin Kline and return a Kline's movie with insurance fraud.

The system adds "a 90's movie," "Baldwin," and "insurance fraud" to the conversation state space. The system returns some results, which may or may not include the movie the user is looking for. By receiving additional inputs from the user, the system adds the user supplied filter. Upon the receipt of an additional input-"murder related," the system puts this additional input to the conversation state space. The system may not return the desired move. The system waits for another input, "possibly Kelvin Kline." For example, the system now adds Kevin Kline as an additional filter. It does not get any results because, for example, there are no connections/relationships/edges between Kevin Kline and Baldwin (either directly or through other nodes). In other words, the relationship distance between them is too far. Thus, the system automatically removes Baldwin as the constraint, thereby inferring the user is providing "Kevin Kline" as the new clue for an actor in the movie. Thus, in some embodiments, more recent constraints are given more importance while earlier constraints are either removed or deemphasized. Moreover, the system can recognize that "Baldwin" is an entity of type Actor and "Kevin Kline" is an entity of type Actor. Given this recognition, the system replaces the saved state entity for Actor with the new Actor entity. Further still, the linguistic analysis of the words surrounding the new Actor entity to infer the user's intent. Specifically, the word "possibly" expressly uncertainty-therefore, this strengthens the inference that the initial Actor entity may have been incorrect.

2) The example below illustrates additions of and a replacement of entities in the conversation state space.
 User: "Tom Cruise movies"
 Response: System gives a set and may ask the user to choose what kind.
 User (implicit filter): "action ones please".
 Response: The system gives Tom Cruise action movies.
 User (implicit filter): "what about comedies".
 Response: The specification of genre "comedies" removes the genre filter "action" in a manner similar to that described above in connection with entity of the same type. So the system presents Tom Cruise comedies.
 User (implicit filter): "any with Dustin Hoffman".
 Response: The system presents Rain Man The system stores "Tom Cruise" and "movies" in the conversation state space. When the system receives "action ones please," the system compares "action" with "Tom Cruise" and "movies" and determines that the relationship distance does not exceed a threshold value. So the system adds "action" to the conversation state space. When the system receives "comedies," the system determines that the relationship distance between "comedies" and "action" exceed the threshold value and replaces "action" with "comedies" in the conversation state space. When the user further specifies the intent by inputting "any with Dustin Hoffman," the system first determines if "Tom Cruise," Dustin Hoffman," and "comedies" are closely related. The system may try to search for Tom Cruise comedies with Dustin Hoffman. Since there aren't any, the system infers that "comedies" no longer applies and removes it. The system tries Tom Cruise movies with Dustin Hoffman and presents Rain Man. In this example, the system is keeping the save state value of Tom Cruise (an entity of Actor type) despite being presented with a new entity that is also an Actor type because of the words included in the subsequent interaction. Specifically, the word "with" implies a coupling of filters or entities. Thus, the system infers the user wishes to use both Tom Cruise and Dustin Hoffman.

3) The order of specifying filters may not matter. The example below is just a variation of the above conversation thread, where order of exchanges differ:
 User: Action movies
 Response: System returns action movies
 User: Tom Cruise
 Response; System returns actions movies with Tom Cruise in it.
 User: comedy
 Response: System returns Tom Cruise movies that are both action and comedy
 User: Dustin Hoffman
 Response: System returns Rain man.

The system stores "action movies" in the conversation state space and returns action movies. The user specifies an actor to narrow the scope of search. The system enters "Tom Cruise" to the conversation state space and returns action movies starring Tom Cruise. When the user enters additional input "comedy," the system returns Tom Cruise movies that are both action and comedy. If there is no such movie, the system may replace "action" with "comedy." When the system receives an input stating "Dustin Hoffman," the system uses "action movies," "comedy," "Tom Cruise," and "Dustin Hoffman" to find a movie. If no movie has a metadata associated with the four entities, the system searches for a movie based on "comedy," "Tom Cruise," and "Dustin Hoffman." When the system finds that Rain Man is a movie that matches these keywords, the system presents Rain Man to the user.

4) The example below illustrates an addition of an entity in the conversation state space.
 User: Tom Cruise
 Response: System response with Tom Cruise movies
 User (implicit filter): Samurai
 Response: System returns The Last Samurai.

The system stores "Tom Cruise" in the conversation state space and presents a list of movies starring Tom Cruise. When the system receives "Samurai," the system determines if "Samurai" and "Tom Cruise" have a close relationship. This measure of relatedness can be determined by looking at the relationship database with graphs. When the system determines that there is a close relationship, the system treats Samurai as an additional entity and enters it in the conversation state space, rather than replacing "Tom Cruise" with "Samurai." Then the system searches for a Samurai movie starring Tom Cruise and presents The Last Samurai 5) The example below illustrates an addition of and a replacement of filters in the conversation state space.
 User: Star Wars
 Response: The system lists every star wars movies.
 User (filter): latest.
 Response: The system presents the latest Star Wars movie.
 User (filter): the second one
 Response: The system presents the second Star Wars movie.

The system stores "Star Wars" in the conversation state space. When it receives another input, "latest," the system puts the input in the conversation state space and presents the latest Star Wars movie to the user. When it receives a further input, "the second one," the conversation state space puts the input in the conversation state space. However, since "the second one" and "latest" are mutually exclusive, except in a case where there are only two movies in a sequence, the system removes "latest" from the state space and returns the second Star Wars movie.

6) The example below illustrates additions of filters in the conversation state space.
 User: Seinfeld
 Response: System responds with Seinfeld shows
 User (selection filter): second season
 Response: System responds with second season episodes
 User (selection): last episode
 Response: System responds with last episode from the second season.

The system stores "Seinfeld" in the conversation state space and presents Seinfeld shows to the user. When the system receives another input, "second season," the system stores the input in the conversation state space and returns second season of Seinfeld. As user provides an additional input, "last episode," the system decides whether the filters "last episode" and "second season" are mutually exclusive. Since these two filters are not mutually exclusive, the system stores "last episode" in the conversation state space. Using all three keywords ("Seinfeld," "second season," and "last episode"), the system presents the last episode from the second season of the Seinfeld shows.

7) The example below illustrates an addition of a filter in the conversation state space.
    User: Star Wars
    Response: System responds with star wars movies
    User (selection): last one
    Response: System responds with the last movie in Star Wars series The system stores "Star Wars" in the conversation state space and presents Star Wars movies. As the user provides the input, "last one," the system stores it in the conversation state space. Using the available entity, "Star Wars," and the filter, "last one," the system presents the last movie in the Star Wars series.

8) The example below illustrates a shortcut created by personalization.
    User: Patriot games
    Response: System returns New England Patriot games.
    User: No, I want the movie.
    Response: System returns the movie "Patriot Games."

The system stores "Patriot games" in the conversation state space. The system's response of presenting the New England Patriot's games is influenced by the user's preference signature reflecting an affinity for New England Patriot games. This illustrates a shortcut linking the Patriot entity to a games entity or concept based on personalization. Without personalization, it may be that "Patriot" and "games" are too far removed to provide the New England Patriots as a result. If the user was not looking for the Patriot's games, the user may provide an additional input. When the system receives the additional input, "No, I want the movie," the system adds "movie" to the conversation state space. When the system finds a content item that has metadata associated with "movie" and "Patriot games," it presents the result to the user. In this example, the system displays the movie Patriot Games.

9) The example below illustrates an addition of an entity in the conversation state space based on a further qualifying question and answer.
    User: Star Trek
    Response: System asks "do you mean the movie or TV series?"
    User: movie
    Response: System returns Star trek movie.

The system stores "Star Trek" into its conversation state space. Since there is an ambiguity for the word, "Star Trek," the system asks an additional question narrowing the scope of the conversation state space. When the user provides a next input, "movie," the system looks at the relationship distance between "movie" and "Star Trek." Since the two keywords have a close relationship, the system uses the new input and the conversation state space to find Star Trek movies. Consequently, the system presents the Star Trek movies to the user.

10) The example below illustrates an addition of a filter in the conversation state space to further limit the results presented to the user.
    User: Who played Obi Wan Kenobi in Star Wars?
    Response: System could respond either with a single result Alec Guinness or a list of results.
    User: I meant new ones.
    Response: System responds with Ewan McGregor.

The system determines the user's intent of finding an entity-an actor. The system also puts "Obi Wan Kenobi" and "Star Wars" into its conversation state space. There may be multiple actors who played the character that the user is searching for. In this example, both Alec Guinness and Ewan McGregor played as Obi Wan Kenobi. The system may return either a full list of results or a partial list. When the user provides a filter "new ones," the system uses the conversation state space including "Obi Wan Kenobi," "Star Wars," and the new filter to determine that the entity user is searching for Ewan McGregor. The system returns Ewan McGregor.

11) The example below illustrates a follow-up action of the system based on finding the desired content item.
    User: Tom Cruise and Dustin Hoffman movies
    Response: System responds "Do you want to watch Rain Man?" User: Yes, I am looking for its availability in Netflix.

This is not a question to resolve an ambiguity but a response style to fit the flow of conversation given a very high confidence value associated with the answer. The system stores "Tom Cruise," "Dustin Hoffman," and "movies" in the conversation state space. In the case where "Rain Man" is the only result or a result with a very high confidence, the system returns possible actions that can be performed based on the fact that the result is a movie. Then the system uses the conversation state space to find the movie's availability in Netflix. The system may search other online streaming or rental websites. Whether to search other sites or not may be based on the user preference signature.

12) The example below illustrates an action of the system when there is a speech-to-text error and a replacement of an entity in the conversation state space.
    User: Who acted as Obi Wanobe in Star Wars.
    Response: The system list all the characters in Star Wars and may also list the actors playing the characters.
    User: (The user corrects herself) I meant Obi Wan Kenobi.
    Response: The system removes other characters and actors, and returns either or both of Alec Guinness and/or Ewan McGregor.

The system first adds "act," "Obi Wanobe," and "Star Wars" to the conversation state space. In this case, either the user did not give the right character name or the system did not detect the user's words correctly. The system understands that the user's intent is finding an entity-an actor's name-in "Star Wars." The system first tries to find a character named "Obi Wanobe," but unable to find it because such a character does not exist. Then the system provides all the characters in "Star Wars" and may also provide the actors who played those characters. When listing all characters and actors, the system may order the list based on how close the pronunciation of "Obi Wanobe" is with the characters. The system replaces "Obi Wanobe" with "Obi Wan Kenobi." Because there is no record for "Obi Wanobe," the relationship distance between the two keywords do not exist or far. When the user corrects herself by saying "I meant Obi Wan Kenobi," the system searches for an actor who played "Obi Wan Kenobi" in "Star Wars." returns Alec Guinness and Ewan McGregor, who acted as "Obi Wan Kenobi" in "Star Wars." "Star Wars" need not be repeated because it is saved in the conversation state. The system may return only one of Guinness and McGregor. Alternatively, when the system could not find "Obi Wanobe," the system may determine a character that sounds most similar to "Obi Wanobe," and return "Obi Wan Kenobi" and the actors who played the character.

13) Another speech-to-text error case example follows.
User: Movie of Tom Cruise and Paul Manning.
Response: The system says "no movie found of Tom cruise and Peyton Manning".
User: Not Peyton Manning. I meant Paul Neumann.
Response: The system presents Color of Money.

In this example, the lexical engine and/or speech to text engine performs a correction on the user input independent of considering whether certain parts of the input are relevant to intent, entities, and/or attributes. In the example, "Paul Neumann" is mistranslated as "Paul Manning" because the name "Manning" is less prevalent that the name "Paul" and is, therefore, given a higher weight by the lexical engine when trying to resolve the input. Alternatively, the user may have simply misspoken the name as "Paul Manning." Further still, in an embodiment in which the entity relationship graphs are taken into account when screening for potential errors in the user input, a user's preferences for American Football may be taken into account and provide "Peyton Manning" as a likely input entity despite the fact that the user did not intend it in this instance. The system stores "movie," "Tom Cruise," and "Paul Manning" in the conversation state space and presents that there is no result. The user recognizes that the system searched for "Peyton Manning," rather than "Paul Neumann," and gives additional input to correct the system. The system recognizes the user's express identification of an erroneous entity "Peyton Manning" and replaces that entity with "Paul Neumann." The system replaces "Payton Manning" with "Paul Neumann" in the conversation state space. Using "Tom Cruise," "movie," and "Paul Neumann" in the conversation state space, the system presents Color of Money.

In some embodiments, as presented in many of the examples above, the system analyzes the speech input and put the relevant keywords in the conversation state space. Then, the system finds the desired content. However, in alternative embodiments, the system may first analyze and searches for the desired content. When the system fails to satisfy the intent of the user, the system records the keywords in the conversation state space and asks for an additional input.

The techniques and systems disclosed herein may be implemented as a computer program product for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Moreover, the techniques and systems disclosed herein can be used with a variety of mobile devices. For example, mobile telephones, smart phones, personal digital assistants, and/or mobile computing devices capable of receiving the signals discussed herein can be used in implementations of the invention.

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. The scope of the invention is as set forth in the appended claims and equivalents thereof, rather than being limited to the examples contained in the foregoing description.

What is claimed is:

1. A computer-implemented method including a hardware processor, the method comprising:
   receiving a first speech input via a user interface;
   storing the first speech input in a conversation space data structure, wherein the conversation space data structure comprises spoken entities;
   selecting a first set of content items based on the first speech input;
   generating identifiers for output for the first set of content items;
   receiving a second speech input via the user interface;
   storing the second speech input in the conversation space data structure;
   selecting a second set of content items by filtering the first set of content items based on the second speech input;
   generating identifiers for output for the second set of content items;
   receiving a third speech input via the user interface;
   storing the third speech input in the conversation space data structure;
   determining that the second speech input and the third speech input are mutually exclusive;
   in response to determining that the second speech input and the third speech input are mutually exclusive:
      removing the second speech input from the conversation space data structure;
      selecting a third set of content items by filtering the first set of content items based on the third speech input; and
      generating identifiers for output for the third set of content items.

2. The method of claim 1, wherein the first speech input is received via the user interface as part of a conversation between a user and a system that displays the user interface;

wherein the second speech input is received via the user interface as part of the conversation between the user and the system that displays the user interface; and wherein the third speech input is received via the user interface as part of the conversation between the user and the system that displays the user interface.

3. The method of claim 1, wherein:
the determining that the second speech input and the third speech input are mutually exclusive comprises determining that filtering the second set of content items by the third speech input results in an empty set.

4. The method of claim 1, wherein:
the determining that the second speech input and the third speech input are mutually exclusive comprises comparing the second speech input and the third speech input.

5. The method of claim 1, further comprising:
generating for output a request to display the second speech input via the user interface; and
wherein the second speech input is received via the user interface in response to the request to display the second speech input.

6. The method of claim 1, further comprising:
generating for output a request to display the third speech input via the user interface; and
wherein the third speech input is received via the user interface in response to the request to displays the third speech input.

7. The method of claim 1, wherein the selecting the first set of content items is further based on user history.

8. The method of claim 1, wherein the selecting of the second set of content items is further based on user history associated with the first set of content items.

9. The method of claim 1, wherein the selecting the first set of content items is further based at least in part on a relationship graph that identifies relationships between a plurality of terms, wherein each content item of the first set of content items corresponds to a respective node of the relationship graph.

10. The method of claim 1, wherein the selecting the second set of content items is further based at least in part on a relationship graph that identifies relationships between a plurality of terms, wherein each content item of the second set of content items corresponds to a respective node of the relationship graph.

11. A system including a hardware processing, the system comprising:
input/output circuitry configured to:
receive a first speech input via a user interface; and
control circuitry configured to:
store the first speech input in a conversation space data structure, wherein the conversation space data structure comprises spoken entities;
select a first set of content items based on the first speech input;
wherein the input/output circuitry is further configured to:
generate identifiers for output for the first set of content items; and
receive a second speech input via the user interface;
wherein the control circuitry is further configured to:
store the second speech input in the conversation space data structure;
select a second set of content items by filtering the first set of content items based on the second speech input;

wherein the input/output circuitry is further configured to:
generate identifiers for output for the second set of content items; and
receive a third speech input via the user interface;
wherein the control circuitry is further configured to:
store the third speech input in the conversation space data structure;
determine that the second speech input and the third speech input are mutually exclusive;
in response to determining that the second speech input and the third speech input are mutually exclusive:
remove the second speech input from the conversation space data structure; and
select a third set of content items by filtering the first set of content items based on the third speech input; and
wherein the input/output circuitry is further configured to:
generate identifiers for output for the third set of content items.

12. The system of claim 11, wherein the input/output circuitry is further configured to:
receive the first speech input via the user interface as part of a conversation between a user and a system that displays the user interface;
receive the second speech input via the user interface as part of the conversation between the user and the system that displays the user interface; and
receive the third speech input via the user interface as part of the conversation between the user and the system that displays the user interface.

13. The system of claim 11, wherein the control circuitry is further configured to determine that the second speech input and the third speech input are mutually exclusive by:
determining that filtering the second set of content items by the third speech input results in an empty set.

14. The system of claim 11, wherein the control circuitry is further configured to determine that the second speech input and the third speech input are mutually exclusive by:
comparing the second speech input and the third speech input.

15. The system of claim 11, wherein the input/output circuitry is further configured to:
generate for output a request to display the second speech input via the user interface; and
wherein the second speech input is received via the user interface in response to the request to display the second speech input.

16. The system of claim 11, wherein the input/output circuitry is further configured to:
generate for output a request to display the third speech input via the user interface; and
wherein the third speech input is received via the user interface in response to the request to display the third speech input.

17. The system of claim 11, wherein the control circuitry is further configured to select the first set of content items further based on user history.

18. The system of claim 11, wherein the control circuitry is further configured to select the first set of content items further based on user history associated with the first set of content items.

19. A non-transitory computer readable medium comprising:
instructions that when executed by control circuitry cause input/output circuitry to:
receive a first speech input via a user interface;
instructions that when executed by the control circuitry cause the control circuitry to:

store the first speech input in a conversation space data structure, wherein the conversation space data structure comprises spoken entities;
select a first set of content items based on the first speech input;
further instructions that when executed by the control circuitry cause the input/output circuitry to:
generate identifiers for output for the first set of content items; and
receive a second speech input via the user interface;
further instructions that when executed by the control circuitry cause the control circuitry to:
store the second speech input in the conversation space data structure;
select a second set of content items by filtering the first set of content items based on the second speech input;
further instructions that when executed by the control circuitry cause the input/output circuitry to:
generate identifiers for output for the second set of content items; and
receive a third speech input via the user interface;
further instructions that when executed by the control circuitry cause the control circuitry to:
store the third speech input in the conversation space data structure;
determine that the second speech input and the third speech input are mutually exclusive;
in response to determining that the second speech input and the third speech input are mutually exclusive:
remove the second speech input from the conversation space data structure; and
select a third set of content items by filtering the first set of content items based on the third speech input; and
further instructions that when executed by the control circuitry cause the input/output circuitry to:
generate identifiers for output for the third set of content items.

20. The non-transitory computer readable medium of claim 19, wherein the instructions that when executed by the control circuitry cause the input/output circuitry to:
receive the first speech input via the user interface as part of a conversation between a user and a system that displays the user interface;
receive the second speech input via the user interface as part of the conversation between the user and the system that displays the user interface; and
receive the third speech input via the user interface as part of the conversation between the user and the system that displays the user interface.

* * * * *